US006873215B2

(12) United States Patent
Devries et al.

(10) Patent No.: US 6,873,215 B2
(45) Date of Patent: Mar. 29, 2005

(54) POWER DOWN SYSTEM AND METHOD FOR INTEGRATED CIRCUITS

(75) Inventors: Christopher Andrew Devries, Ottawa (CA); Ralph Dickson Mason, Ottawa (CA)

(73) Assignee: ENQ Semiconductor, Inc., Ottawa (CA)

( * ) Notice: Subject to any disclaimer, the term of this patent is extended or adjusted under 35 U.S.C. 154(b) by 48 days.

(21) Appl. No.: 10/629,138

(22) Filed: Jul. 28, 2003

(65) Prior Publication Data

US 2004/0063473 A1 Apr. 1, 2004

(30) Foreign Application Priority Data

Jul. 29, 2002 (CA) ............................................. 2393651

(51) Int. Cl.[7] .......................... G01R 23/00; H03B 5/04; H03L 7/00
(52) U.S. Cl. .............................. 331/44; 331/49; 331/65; 331/66; 331/173; 327/141; 327/151; 327/160
(58) Field of Search ............................. 331/44, 46, 49, 331/65–66, 143, 158, 173, 175; 327/141–145, 151, 160, 162; 713/320, 322, 323

(56) References Cited

U.S. PATENT DOCUMENTS

| | | | |
|---|---|---|---|
| 5,058,203 A | 10/1991 | Inagami | 455/89 |
| 5,142,699 A | 8/1992 | Sato et al. | 455/343 |
| 5,280,650 A | 1/1994 | Sobti | 455/343 |
| 5,283,568 A | 2/1994 | Asai et al. | 340/825.44 |
| 5,428,820 A | 6/1995 | Okada et al. | 455/38.3 |
| 5,448,755 A | 9/1995 | Tanaka | 455/38.3 |
| 5,845,204 A | 12/1998 | Chapman et al. | 455/343 |
| 6,029,061 A | 2/2000 | Kohlschmidt | 455/343 |
| 6,091,527 A | 7/2000 | Brisse et al. | 359/143 |
| 6,111,927 A | 8/2000 | Sokoler | 375/365 |
| 6,311,081 B1 | 10/2001 | Northcutt et al. | 455/574 |
| 6,353,749 B1 | 3/2002 | Siponen | 455/574 |
| 6,356,956 B1 | 3/2002 | Deo et al. | 709/318 |
| 6,415,388 B1 | 7/2002 | Browning et al. | 713/322 |
| 6,434,405 B1 | 8/2002 | Sashihara | 455/557 |
| 6,469,989 B1 | 10/2002 | Ernst | 370/311 |
| 6,473,607 B1 * | 10/2002 | Shohara et al. | 455/343.1 |
| 6,650,189 B1 | 11/2003 | Romao | 331/49 |
| 2002/0000889 A1 | 1/2002 | Kim | 331/143 |

FOREIGN PATENT DOCUMENTS

FR 99 04099 1/1999

* cited by examiner

*Primary Examiner*—David Mis
(74) *Attorney, Agent, or Firm*—Mathews, Collins, Shepherd & McKay, P.A.

(57) ABSTRACT

A power down system and method for an integrated circuit that enables a power down mode to be maintained for a predetermined time is described herein. The power down system comprises an oscillator, a low power oscillator and an oscillator control circuit controlling both the oscillator and the low power oscillator. The oscillator control circuit including at least one real time counter. The oscillator control circuit being so configured that the oscillator is energized when said oscillator control circuit is in a normal mode and that, when a power down signal is received: a) the oscillator control circuit measures an oscillation frequency of the low power oscillator, b) the oscillator control circuit uses the measured oscillation frequency of the low power oscillator to set the real time counter so as to maintain the power down mode for the predetermined time, c) the oscillator control circuit turns off the oscillator and uses the low power oscillator for the duration of the power down.

25 Claims, 3 Drawing Sheets

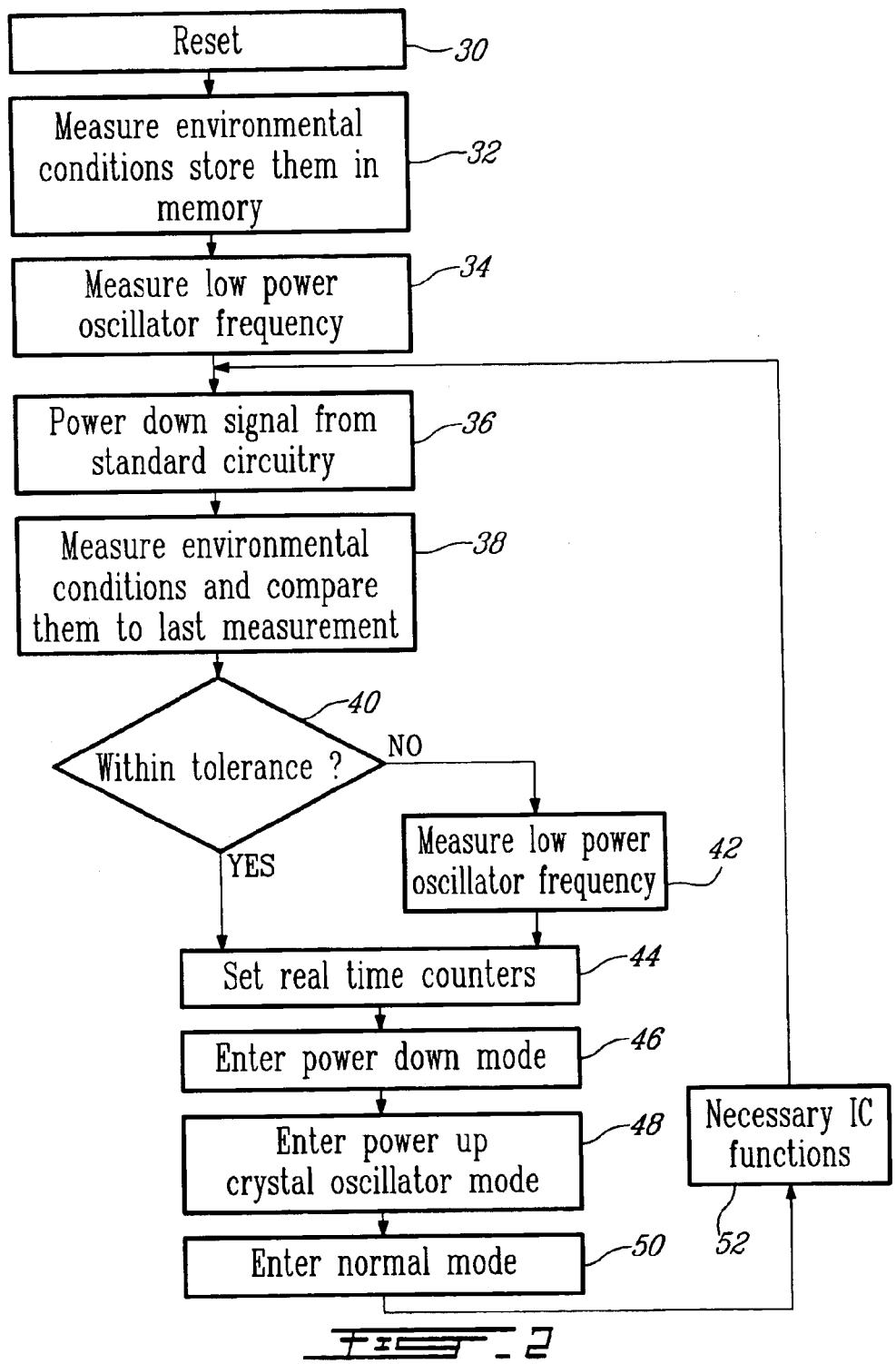

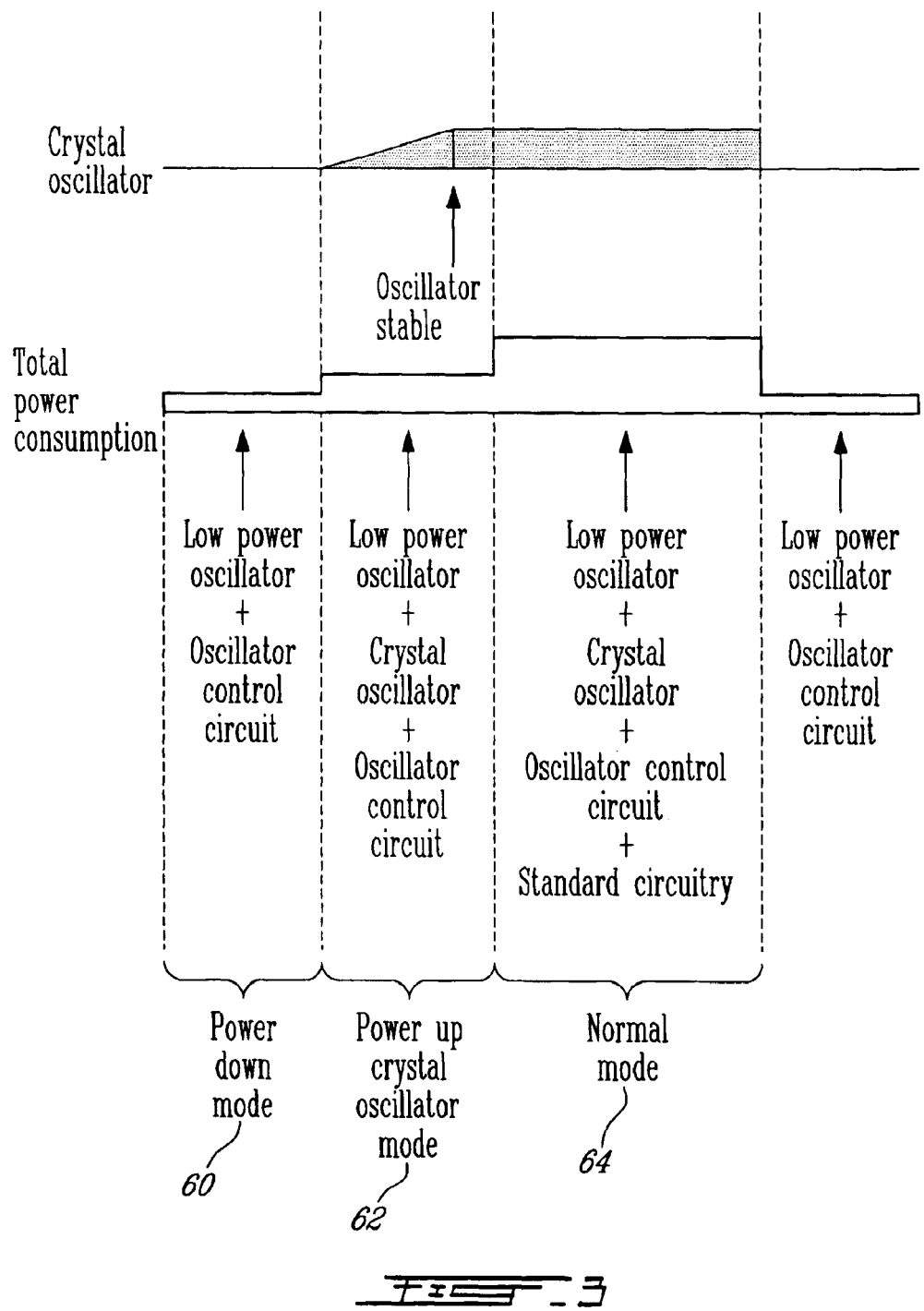

POWER DOWN SYSTEM AND METHOD FOR INTEGRATED CIRCUITS

FIELD OF THE INVENTION

The present invention relates to Integrated Circuits (ICs). More specifically, the present invention is concerned with a power down system and method for ICs.

BACKGROUND OF THE INVENTION

Many ICs have a power down mode that is used to save power and, in the case of battery powered environments, extend the battery life of the system.

The transition from the power down mode to the normal mode is usually controlled by an external interrupt signal or is pre-programmed at fixed intervals. The latter case is most common in sand alone systems where an IC must "wake up" at predetermined intervals to perform functions such as monitor sensors or communicate with other devices, for example.

When an IC is required to wake-up at known intervals, some circuitry is required to be operating even during the power down mode to keep track of time and to wake the IC up. This circuitry usually includes an oscillator that is sufficiently precise and a real time counter. The oscillator is often a crystal oscillator since it is very precise and is not sensible to environmental variations such as temperature and input voltage variations. A drawback of using a crystal oscillator is that it requires a relatively large biais current (in the order of tens of $\mu$A) during the power down mode.

To overcome this drawback, Chapman et al. in their U.S. Pat. No. 5,845,204 issued on Dec. 1, 1998 and entitled "Method and apparatus for controlling the wakeup logic of a radio receiver in sleep mode" suggested the use of two oscillators. A crystal oscillator for its precision and a low power ring oscillator that runs in the sleep mode. During the wakeup time, the low power ring oscillator is calibrated to compensate for its inaccuracy. While Chapman's method and apparatus is an improvement over apparatuses using crystal oscillator during the sleep mode, it still has drawbacks related to the compensation of the ring oscillator frequency.

OBJECTS OF THE INVENTION

An object of the present invention is therefore to provide a power down system and method for Integrated Circuits.

SUMMARY OF THE INVENTION

More specifically, in accordance with the present invention, there is provided a power down system for an integrated circuit that enables a power down mode to be maintained for a predetermined time; said power down system comprising:

an oscillator;

a low power oscillator;

at least one environmental sensor; and an oscillator control circuit controlling both said oscillator and said low power oscillator and receiving data from said at least one environmental sensor; said oscillator control circuit including a real time counter; said oscillator control circuit being so configured that said oscillator is energized when said oscillator control circuit is in a normal mode; said oscillator control circuit being so configured that:

when a reset signal is received:

environmental data is acquired by said oscillator control circuit and stored in a first memory; and said oscillator control circuit measures an oscillation frequency of said low power oscillator and stores the frequency in a second memory;

when a power down signal is received:

environmental data is acquired by said oscillator control circuit and compared with the stored environmental data;

should the acquired environmental data differ from the stored environmental data by at least a predetermined tolerance, said oscillator control circuit measures an oscillation frequency of said low power oscillator and overwrites the data contained in the second memory;

said oscillator control circuit uses the oscillation frequency of said low power oscillator stored in the second memory to set said real time counter so as to maintain the power down mode for the predetermined time, and said oscillator control circuit turns off said oscillator and uses said low power oscillator for the duration of the power down.

According to another aspect of the present invention, there is provided a power down method for an integrated circuit that enables a power down mode to be maintained for a predetermined duration; said integrated circuit including an oscillator, a low power oscillator, at least one environmental sensor, standard circuitry and an oscillator control circuit having a real time counter, memory and controlling both the oscillator and the low power oscillator and connected to the at least one environmental sensor; said power down method comprising:

measuring initial environmental data;

measuring an initial oscillation frequency of the low power oscillator and storing it in memory;

receiving a power down signal;

measuring environmental data and comparing with the initial environmental data;

should the environmental data differ from the initial environmental data by at least a predetermined tolerance, measuring an oscillation frequency of the low power oscillator and overwrite the initial oscillation frequency in memory;

setting the real time counter as a function of the oscillation frequency in memory so as to maintain the power down mode for the predetermined duration; and turning off the oscillation of the oscillator and the standard circuitry for the duration of the power down mode, as determined by the real time counter.

According to another aspect of the present invention, there is provided a power down system for an integrated circuit that enables a power down mode to be maintained for a predetermined time; said integrated circuit including standard circuitry; said power down system comprising:

an oscillator;

a low power oscillator; and an oscillator control circuit controlling both said oscillator and said low power oscillator; said oscillator control circuit including a real time counter; said oscillator control circuit being so configured that:

said oscillator is energized when said oscillator control circuit is in a normal mode;

when a measurement of an oscillation frequency of said low power oscillator is required, the standard circuitry of the integrated circuit is turned off;

when a power down signal is received: a) said oscillator control circuit uses the measured oscillation frequency of said low power oscillator to set said real time counter so as to maintain the power down mode for the predetermined time, and b) said oscillator control circuit turns off said oscillator and uses said low power oscillator for the duration of the power down.

According to yet another aspect of the present invention, there is provided a power down method for an integrated circuit that enables a power down mode to be maintained for a predetermined duration; said integrated circuit including standard circuitry, an oscillator, a low power oscillator and an oscillator control circuit having a real time counter and controlling both the oscillator and the low power oscillator; said power down method comprising:

receiving a power down signal;

when predetermined conditions are met, shutting down the standard circuitry; measuring an oscillation frequency of the low power oscillator; powering up the standard circuitry;

setting the real time counter as a function of the measured oscillation frequency of the low power oscillator so as to maintain the power down mode for the predetermined duration; and turning off the oscillation of the oscillator and shutting down the standard circuitry for the duration of the power down mode, as determined by the real time counter.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 2 is a flowchart illustrating the operation of the IC of FIG. 1; and

FIG. 3 is a timing diagram illustrating the total power consumption and the crystal oscillator oscillation with respect to the different modes of operation.

DETAILED DESCRIPTION

Figure 1:
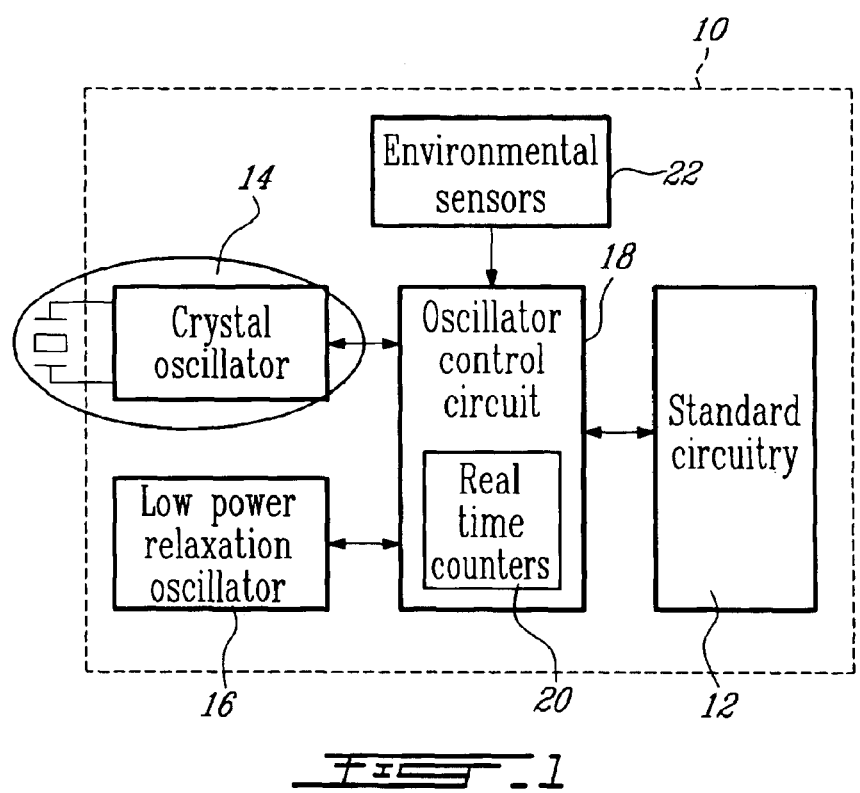
FIG. 1 is a schematic bloc diagram of an IC provided with a power down system according to an embodiment of the present invention.

Generally, the present invention proposes a power down system and method for ICs that uses two different oscillators. A high precision oscillator, for example a crystal oscillator, is used when the IC is in its normal mode and a low power oscillator, for example a relaxation or RC oscillator, is used when the IC is in a power down mode. Since low power oscillators are usually less precise, harder to control and more sensitive to environmental changes, their frequency is measured and real time counters are adjusted so that the predetermined interval between wake-ups is maintained. The low power oscillator frequency measurement may be done at a predetermined duty cycle or can be triggered by environmental changes, as will be described hereinbelow.

Turning now to FIG. 1 of the appended drawings, an IC 10 including a power down system according to an embodiment of the present invention will be described.

The IC 10 includes standard circuitry 12 to enable the IC 10 to perform its intended functions, a high precision oscillator in the form of a crystal oscillator 14, a low power oscillator in the form of a low power relaxation oscillator 16; an oscillator control circuit 18 connected to the standard circuitry 12 and to both oscillators 14 and 16, and environmental sensors 22. The oscillator control circuit includes real time counters 20, the purpose of which will be described hereinbelow.

The interconnection between the standard circuitry 12 and the oscillator control circuit 18 enables the standard circuitry 12 to send a power down signal to the oscillator control circuit 18 when a power down mode is requested. Furthermore, as will be understood by one skilled in the art, the oscillator control circuit 18 supplies to the standard circuitry 12 at least one clock signal derived from the oscillators 14 and 16 and other signals intended to "wake-up" the standard circuitry 12 after a power down mode, as will be described hereinbelow.

The low power relaxation oscillator 16 may be, for example a Schmitt trigger with programmable frequency, limited power dissipation and power down control. Of course, other low power oscillators such as ring oscillators and RC oscillators could be used.

The environmental sensors 22 include, for example, temperature, voltage and IC process variation sensors. They are connected to the oscillator control circuit 18 to supply environmental data thereto.

Turning now to the flowchart of FIG. 2 of the appended drawings, the operation of the power down arrangement of the IC 10 will be described.

In a first step 30, the system is reset. This is usually done when the IC is first powered. During the normal operation of the IC, it is in a so-called "normal" mode and the crystal oscillator supplies the clock signal to the standard circuitry via the oscillator control circuit.

When the IC is reset, it causes the oscillator control circuit to obtain environmental data from the environmental sensors (step 32). This data is stored in a memory of the oscillator control circuit.

Step 34 is the measurement of the oscillation frequency of the low power oscillator. It is to be noted that it has been found that the measurement of the frequency of the low power oscillator is advantageously made in a similar mode to that of the power down mode. Changes in the current draw on a battery (resulting in a supply voltage change) create an error in the resulting measurement of the low power oscillator frequency. Accordingly, a low power measurement mode is also created where a minimal amount of circuitry is powered up to allow the measurement of the low power oscillator to be made.

The low power oscillator frequency measurement step therefore includes three sub-steps. First, the standard circuitry of the IC is shut down, then the frequency of the low power oscillator is measured using the crystal oscillator as a reference and then the standard circuitry is powered back up.

Eventually, the standard circuitry sends a power down signal to the oscillator control circuit (step 36). This signal instructs the oscillator control circuit that the standard circuitry wishes to enter the power down mode for a predetermined period of time. The length of this period may be pre-programmed in the oscillator control circuit or may be sent as a parameter in the power down signal.

When the oscillator control circuit receives the power down signal, it first acquires environment data from the environmental sensors and compares this data to the last stored measurements (step 38).

In step 40, the oscillator control circuit verifies that the environmental data measured in step 38 is within predetermined tolerances. It is to be noted that the tolerances vary from one set of environmental data to another and are function of the type of low power oscillator used.

If the measured environmental data is not within tolerances, step 42 is done and the low power oscillator frequency is measured in a manner identical to step 34.

In step 44, using the measured frequency of the low power oscillator in step 34 or 42, and knowing the predetermined power down time requested by the standard circuitry, the oscillator control circuit sets a first real time counter so that it will know when to wake up the standard circuitry. Since the oscillator control circuit knows how long the power down mode is to last and knows the frequency of oscillation of the low power oscillator, it can calculate the number of oscillations of the low power oscillator required and store this result in the first real time counter.

Since the startup time of the crystal oscillator is significant and not precise from one time to the next, a second real time counter is used with the low power oscillator so that the oscillator control circuit will know when to wake up the crystal oscillator, a predetermined delay before the wake up of the standard circuitry. The difference of time between the first real time counter and the second real time counter being the length of the power up crystal oscillator mode as will be described hereinbelow. As will easily be understood by one skilled in the art, the length of time for the power up crystal oscillator mode can be determined based on environment conditions provided by the environment sensors 22.

The IC then enters the power down mode in step 46. During the power down mode, the power to the standard circuitry and to the crystal oscillator is shut off. Only the oscillator control circuit and the low power oscillator draw power. More specifically, the oscillator control circuit includes a state machine or microcontroller that is capable of carrying out the necessary algorithm for measuring and comparing environmental sensor data and measuring low power oscillator frequency and calculating the power down time. The only sections of the oscillator control circuitry needed during power down are the real time counters and the circuitry, which determines when to enter power up crystal oscillator mode and normal mode. Thus, only these sections of the oscillator control circuit and the low power oscillator draw power during power down.

Before the oscillator control circuit determines that it is time to wake up the standard circuitry, the IC enters a power up crystal oscillator mode (step 48) where the crystal oscillator is energized. It stays in this mode for a predetermined period of time (calculated and set in the second real time counter during step 44) to allow the output signal of the crystal oscillator to stabilize its frequency.

The normal mode is then resumed (step 50) by powering up the standard circuitry that may accomplish its programmed functions (step 52) before returning to step 36 to repeat the cycle.

Optionally, the measured frequency of oscillation of the relaxation oscillator 16 may be used to measure the frequency of oscillation of the crystal oscillator 14 during power up crystal mode to allow the adjustment of the bias currents of the crystal oscillator to optimize power consumption versus the power up time.

Turning now to FIG. 3 of the appended drawings, a timing diagram showing the basic operation of the power down system will be described.

As mentioned hereinabove and illustrated in FIG. 3, there are four possible modes: a power down mode 60, a power up crystal oscillator mode 62, a measure oscillator frequency mode (not shown) and a normal mode 64.

In the power down mode 60, only the low power oscillator and the oscillator control circuit are energized. Therefore, the crystal oscillator is shut down and the power consumption is minimal.

In the power up crystal oscillator mode 62, the low power oscillator, the crystal oscillator and the oscillator control circuit are energized. The total power consumption is therefore higher than the power down mode. As can be seen in the crystal oscillation diagram, the frequency of the crystal oscillation becomes stable during this mode.

In the measure oscillator frequency mode, described hereinabove but not shown in FIG. 3, only the two oscillators and the oscillator control circuit are powered up. This mode is relatively short and used only when the frequency of the low power oscillator has to be measured.

Finally, in the normal mode 64 the standard circuitry is brought online. Therefore, the total power consumption is higher than during the other modes. It is to be noted that the low power oscillator may be turned off during the normal mode to reduce noise and to reduce the power consumption.

Although the present invention has been described hereinabove by way of preferred embodiments thereof, it can be modified, without departing from the spirit and nature of the subject invention as defined in the appended claims.

What is claimed is:

1. A power down system for an integrated circuit that enables a power down mode to be maintained for a predetermined time; said power down system comprising:

an oscillator;

a low power oscillator;

at least one environmental sensor; and an oscillator control circuit controlling both said oscillator and said low power oscillator and receiving data from said at least one environmental sensor; said oscillator control circuit including a real time counter; said oscillator control circuit being so configured that said oscillator is energized when said oscillator control circuit is in a normal mode; said oscillator control circuit being so configured that:

when a reset signal is received:
environmental data is acquired by said oscillator control circuit and stored in a first memory; and
said oscillator control circuit measures an oscillation frequency of said low power oscillator and stores the frequency in a second memory;

when a power down signal is received:
environmental data is acquired by said oscillator control circuit and compared with the stored environmental data;
should the acquired environmental data differ from the stored environmental data by at least a predetermined tolerance, said oscillator control circuit measures an oscillation frequency of said low power oscillator and overwrites the data contained in the second memory;
said oscillator control circuit uses the oscillation frequency of said low power oscillator stored in the second memory to set said real time counter so as to maintain the power down mode for the predetermined time, and
said oscillator control circuit turns off said oscillator and uses said low power oscillator for the duration of the power down.

2. The power down system recited in claim 1, wherein said oscillator is a crystal oscillator.

3. The power down system recited in claim 1, wherein said low power oscillator is selected from the group consisting of relaxation oscillators, ring oscillators and RC oscillators.

4. The power down system recited in claim 1, wherein said low power oscillator includes a Schmitt trigger oscillator.

5. The power down system recited in claim 1, wherein said at least one environmental sensor is selected from the group consisting of temperature sensors, IC process variation sensors and voltage sensors.

6. The power down system recited in claim 1, wherein said oscillator control circuit further includes a second real time counter; and wherein, when a power down signal is received, said oscillator control circuit sets said second real time counter using the measured oscillation frequency of the low power oscillator so that said oscillator control circuit may turn on the oscillator before the power down is terminated to allow an oscillation frequency of said oscillator to stabilize.

7. A power down method for an integrated circuit that enables a power down mode to be maintained for a predetermined duration; said integrated circuit including an oscillator, a low power oscillator, at least one environmental sensor, standard circuitry and an oscillator control circuit having a real time counter, memory and controlling both the oscillator and the low power oscillator and connected to the at least one environmental sensor; said power down method comprising:

measuring initial environmental data;

measuring an initial oscillation frequency of the low power oscillator and storing it in memory;

receiving a power down signal;

measuring environmental data and comparing with the initial environmental data;

should the environmental data differ from the initial environmental data by at least a predetermined tolerance, measuring an oscillation frequency of the low power oscillator and overwrite the initial oscillation frequency in memory;

setting the real time counter as a function of the oscillation frequency in memory so as to maintain the power down mode for the predetermined duration; and turning off the oscillation of the oscillator and the standard circuitry for the duration of the power down mode, as determined by the real time counter.

8. The power down method recited in claim 7, wherein said initial environmental data measuring act includes transferring environmental data from the at least one environmental sensor to the oscillator control circuit.

9. The power down method recited in claim 7, wherein said environmental data measuring act includes transferring environmental data from the at least one environmental sensor to the oscillator control circuit.

10. The power down method recited in claim 7, wherein the predetermined duration of the power down mode is fixed.

11. The power down method recited in claim 7, wherein the predetermined duration of the power down mode is supplied within the power down signal.

12. The power down method of claim 7, wherein said initial oscillation frequency measuring act includes shutting down the standard circuitry of the integrated circuit while the measurement of the initial oscillation frequency is done.

13. The power down method of claim 7, wherein said oscillation frequency measuring act includes shutting down the standard circuitry of the integrated circuit while the measurement of the oscillation frequency is done.

14. The power down method of claim 7, wherein the oscillator control circuit includes a second real time counter; said method including:

setting the second real time counter using the oscillation frequency of the low power oscillator to a duration shorter that the predetermined duration of the down time;

when the shorter duration expires, turning on the oscillator of the integrated circuit to allow an oscillation frequency thereof to stabilize;

when the predetermined down time duration expires, turning on the standard circuitry of the integrated circuit.

15. A power down system for an integrated circuit that enables a power down mode to be maintained for a predetermined time; said integrated circuit including standard circuitry; said power down system comprising:

an oscillator;

a low power oscillator; and an oscillator control circuit controlling both said oscillator and said low power oscillator; said oscillator control circuit including a real time counter; said oscillator control circuit being so configured that:

said oscillator is energized when said oscillator control circuit is in a normal mode;

when a measurement of an oscillation frequency of said low power oscillator is required, the standard circuitry of the integrated circuit is turned off;

when a power down signal is received: a) said oscillator control circuit uses the measured oscillation frequency of said low power oscillator to set said real time counter so as to maintain the power down mode for the predetermined time, and b) said oscillator control circuit turns off said oscillator and uses said low power oscillator for the duration of the power down.

16. The power down system recited in claim 15, wherein said oscillator is a crystal oscillator.

17. The power down system recited in claim 15, wherein said low power oscillator is selected from the group consisting of relaxation oscillators, ring oscillators and RC oscillators.

18. The power down system recited in claim 15, wherein said low power oscillator includes a Schmitt trigger oscillator.

19. The power down system recited in claim 15, wherein said oscillator control circuit is so configured that a measurement of an oscillation frequency of said low power oscillator is required when the integrated circuit is reset.

20. The power down system recited in claim 15, wherein said oscillator control circuit is so configured that a measurement of an oscillation frequency of said low power oscillator is required when environmental changes occur.

21. The power down system recited in claim 15, wherein said oscillator control circuit further includes a second real time counter; and wherein, when a power down signal is received, said oscillator control circuit sets said second real time counter using the measured oscillation frequency of the low power oscillator so that said oscillator control circuit may turn on the oscillator before the power down is terminated to allow an oscillation frequency of said oscillator to stabilize.

22. A power down method for an integrated circuit that enables a power down mode to be maintained for a predetermined duration; said integrated circuit including standard circuitry, an oscillator, a low power oscillator and an oscillator control circuit having a real time counter and controlling both the oscillator and the low power oscillator; said power down method comprising:

receiving a power down signal;

when predetermined conditions are met, shutting down the standard circuitry; measuring an oscillation frequency of the low power oscillator; powering up the standard circuitry;

setting the real time counter as a function of the measured oscillation frequency of the low power oscillator so as to maintain the power down mode for the predetermined duration; and turning off the oscillation of the oscillator and shutting down the standard circuitry for the duration of the power down mode, as determined by the real time counter.

23. The power down method recited in claim 22, wherein predetermined conditions include a modification of environmental conditions of the integrated circuit.

24. The power down method recited in claim 22, wherein predetermined conditions include a reception of a reset signal.

25. The power down method recited in claim 22, wherein the oscillator control circuit includes a second real time counter; said method including:

setting the second real time counter using the oscillation frequency of the low power oscillator to a duration shorter that the predetermined duration of the down time;

when the shorter duration expires, turning on the oscillator of the integrated circuit to allow an oscillation frequency thereof to stabilize;

when the predetermined down time duration expires, turning on the standard circuitry of the integrated circuit.

* * * * *